(12) United States Patent
Ryan et al.

(10) Patent No.: US 12,330,031 B2
(45) Date of Patent: Jun. 17, 2025

(54) SPORTS EQUIPMENT GRIP INSTALLATION SYSTEM AND METHOD

(71) Applicant: Eaton Intelligent Power Limited, Dublin (IE)

(72) Inventors: Padhraig Ryan, Keatingstown (IE); Gregory Cavill, Pinehurst, NC (US); Sara Holland, Southern Pines, NC (US); James Ledford, Pinehurst, NC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/293,820

(22) PCT Filed: Oct. 13, 2021

(86) PCT No.: PCT/EP2021/078324
§ 371 (c)(1),
(2) Date: Jan. 31, 2024

(87) PCT Pub. No.: WO2023/011742
PCT Pub. Date: Feb. 9, 2023

(65) Prior Publication Data
US 2024/0335718 A1 Oct. 10, 2024

Related U.S. Application Data

(60) Provisional application No. 63/229,895, filed on Aug. 5, 2021.

(51) Int. Cl.
*A63B 60/42* (2015.01)
*A63B 53/14* (2015.01)
(Continued)

(52) U.S. Cl.
CPC .............. *A63B 60/42* (2015.10); *A63B 53/14* (2013.01); *A63B 71/0622* (2013.01);
(Continued)

(58) Field of Classification Search
CPC ..... A63B 60/42; A63B 53/14; A63B 71/0622; A63B 2071/0625; A63B 2071/0694; A63B 2220/13; A63B 2220/807
See application file for complete search history.

(56) References Cited

U.S. PATENT DOCUMENTS 6,415,502 B1 7/2002 Gunshinan et al.
6,775,891 B1 8/2004 Tsiguloff
(Continued)

FOREIGN PATENT DOCUMENTS

WO 01/05470 A1 1/2001

*Primary Examiner* — Lawrence Averick
(74) *Attorney, Agent, or Firm* — LEYDIG, VOIT & MAYER, LTD.

(57) ABSTRACT

The golfer's grip on their golf club affects performance. Minor changes in grip can have a significant impact on the outcome of a golf shot. To improve grip alignment, it is known for a golf grip to be provided with a visual or physical indicator that a golfer may use as a reference when aligning their grip. For the visual or physical indicator to be useful, it must be correctly aligned with the leading edge of the golf club. The present disclosure provides a grip installation system and method. The system includes a jig, a clamp configured to retain and support a golf club on the jig, and an alignment device. The alignment device includes a camera, a position sensor, a processor and a feedback device. The processor is configured to carry out a method to accurately and reliably install a golf grip on the golf club.

25 Claims, 5 Drawing Sheets

(51) Int. Cl.
*A63B 71/06* (2006.01)
*B23P 21/00* (2006.01)
*B25G 3/00* (2006.01)

(52) U.S. Cl.
CPC ................ *B23P 21/00* (2013.01); *B25G 3/00* (2013.01); *A63B 2071/0625* (2013.01); *A63B 2071/0694* (2013.01); *A63B 2220/13* (2013.01); *A63B 2220/807* (2013.01)

(56) References Cited

U.S. PATENT DOCUMENTS

| | | | | |
|---|---|---|---|---|
| 6,871,414 | B2* | 3/2005 | Burney | A63B 60/42 |
| | | | | 33/549 |
| 6,877,201 | B2* | 4/2005 | Gunshinan | A63B 53/14 |
| | | | | 33/645 |
| 10,343,041 | B2* | 7/2019 | Arch | G01D 5/02 |
| 11,475,599 | B2* | 10/2022 | Shaw | A63B 24/0003 |
| 11,554,302 | B1* | 1/2023 | Power | A63B 60/42 |
| 11,752,409 | B1* | 9/2023 | Power | A63B 60/42 |
| | | | | 29/407.04 |
| 11,948,334 | B2* | 4/2024 | Shaw | A63B 24/0006 |
| 11,992,739 | B1* | 5/2024 | Power | G01B 5/0023 |
| 2004/0221464 | A1* | 11/2004 | Burney | A63B 60/42 |
| | | | | 33/508 |
| 2005/0000075 | A1* | 1/2005 | Gunshinan | A63B 60/42 |
| | | | | 29/721 |
| 2005/0119065 | A1 | 6/2005 | Bettencourt et al. | |
| 2018/0369670 | A1* | 12/2018 | Arch | G01D 5/02 |
| 2019/0378303 | A1* | 12/2019 | Shaw | G06T 7/74 |
| 2023/0066820 | A1* | 3/2023 | Shaw | A63B 53/047 |
| 2024/0249439 | A1* | 7/2024 | Shaw | G06T 7/70 |

* cited by examiner

SPORTS EQUIPMENT GRIP INSTALLATION SYSTEM AND METHOD

FIELD OF THE DISCLOSURE

The present disclosure relates to a sports equipment grip installation system and method and finds particular, although not exclusive, utility in a system and method for accurately fitting a golf grip on a golf club.

BACKGROUND TO THE DISCLOSURE

One of the most important factors affecting performance in a racquet, bat or club based sport, such as golf, is the athlete's grip on their sports equipment, such as a golf club. Minor changes in grip can have a significant impact on the outcome of a shot or other sporting action. In golf, the shape or curve direction of the shot in particular may be affected by the golfer's grip. For a right handed golfer, a so-called strong grip may result in a relatively closed club face at impact, causing a shot with a right to left shot shape such as a draw, a pull or a hook. A so-called weak grip may result in a relatively open club face at impact, causing a shot with a left to right shot shape such as a fade, a push or a slice. Therefore, even if two identical swings are made but with different grips, significantly different shot outcomes may be observed. It is important, therefore, for a golfer to be able to place their grip appropriately to achieve their desired shot shape and shot outcome.

Some golfers find it difficult to align their grip based on their view of the club head alone. Consequently, a golfer may misalign their grip. To improve the ease of grip alignment, it is known for a golf grip to be provided with a visual or physical indicator that a golfer may use as a reference when aligning their grip. For example, the golf grip may be provided with a line or a ridge that is aligned with a leading edge of the club face, or at some preferred offset relative to the leading edge. However, for the visual or physical indicator to be useful, the indicator must be correctly aligned.

When a golf grip is fitted, it is typical for the alignment to be made by eye. As such, the fitter may look along the length of the golf club shaft and visually confirm that the visual or physical indicator is correctly aligned. However, the alignment is dependent on the skill and experience of the particular fitter, and human error may result in a grip being incorrectly fitted. Minor errors in alignment may become pronounced across a full set of golf clubs. Additionally, having differently aligned grips across the set of clubs may prevent the golfer from accurately adjusting their alignment relative to the visual or physical indicator to create the desired alignment or to account for any misalignment in the grips.

Therefore, it is desirable to provide a golf grip installation system and method that can allow for a golf grip to be fitted more accurately and in a repeatable manner. Objects and aspects of the present disclosure seek to provide such a system and method.

SUMMARY OF THE DISCLOSURE

According to a first aspect of the present disclosure, there is provided a sports equipment grip installation system for installing a grip of the type including an alignment indicator, the system comprising: a jig comprising a clamp configured to, in use, receive and retain a golf club therein such that a shaft of the golf club is held within a predetermined plane; and an alignment device comprising a camera, a position sensor and a processor configured and operable to: determine an alignment of the alignment device with respect to the predetermined plane based on an output of the position sensor; output a first prompt for the alignment device to be moved to align with the predetermined plane; capture at least one first image with the camera; determine, with a shaft identification algorithm and the at least one first image, a relative alignment of the camera with respect to the shaft of the golf club; output a second prompt for the alignment device or golf club to be moved such that the camera is aligned with the shaft of the golf club; capture at least one second image with the camera; determine, with a club head identification algorithm and the at least one second image, a position of a leading edge of a club head of the golf club relative to the predetermined plane; receive a predetermined optimal golf grip alignment position indicating an optimal position of an alignment indicator of a golf grip with respect to the leading edge of the golf club; and output a grip installation instruction indicating an installation orientation for the golf grip such that, following installation of the golf grip in the installation orientation, the alignment indicator of the golf grip is positioned according to the predetermined optimal alignment position.

A key advantage of the golf grip installation system is that the grip installation instruction may be used by a user, or provided to an automated fitting system, such that the grip is installed with the alignment indicator positioned according to the predetermined optimal alignment position. Use of the system may reduce or remove alignment errors and variations in grip alignment across a set of sports equipment, such as golf clubs, thereby allowing an athlete, such as a golfer, to accurately and confidently align their grip relative to the alignment indicator.

A grip of the type including an alignment indicator may be a grip including a visual or physical mark, characteristic or profile that may be used by an athlete to repeatedly make the same grip on their equipment by placing their hands in positions relative to the alignment indicator. For example, a golf grip may include a ridge or a coloured line that a golfer may use as a reference when placing their hands on the grip. Having the ridge or line aligned with the leading edge of the clubface may allow a user to align their grip relative to the leading edge in a preferred manner.

The jig may be a support structure. The jig may be suitable to hold and retain the sports equipment, the camera and any other devices such as actuators in the required positions. The clamp may be a mechanical, electromechanical or any other device configured to releasably retain the sports equipment in or on the jig. The predetermined plane may be a horizontal plane, a vertical plane or any other plane. The predetermined plane may be adjustable by a user, by moving or actuating at least a portion of the jig or clamp.

The camera may be image capture apparatus. As such, the camera may comprise any apparatus or device suitable for capturing images. The camera may be configured to capture single, discrete images. Alternatively, the camera may be configured to capture and provide a video feed, such as a live video feed. The at least one first image and/or the at least one second image may include a single image, a series of single images such as a continuous feed of images spaced in time, or a video feed. The images or video feed may be live.

The position sensor may comprise an accelerometer, a gyroscope and/or any other known sensor capable of determining a relative position. The system may be configured to account for the effects of gravity on the position sensor, should the position sensor comprise an accelerometer or other sensor sensitive to gravity.

The processor may be local, distributed, cloud based, edge computing based, or any combination thereof. Any or each prompt may be a computerised message or a data packet. Accordingly, the prompt may be used by a computerised device to provide the prompt to a user or to take action upon receipt of the prompt. For example, the prompt may cause a feedback device to provide visual or audible feedback to a user. As an alternative example, the prompt may cause an actuator to move the sports equipment to a preferred position.

Determining a relative alignment of the camera with respect to the shaft or body of the sports equipment may include identifying the shaft or body, identifying a characteristic of the shaft or body, and determining a relative alignment of the camera with respect to the characteristic. For example, with a golf club, the shaft of the golf club may be identified and the camera may be aligned with a longitudinal axis of the shaft.

Determining a position of a contact surface of the sports equipment relative to the predetermined plane may include identifying the contact surface and determining an orientation of the contact surface relative to the predetermined plane. For example, with a golf club, the club head may be identified, a face of the club head may be identified, and a leading edge of the club face may be identified. The orientation of the leading edge relative to the predetermined plane may then be determined.

The predetermined optimal grip alignment position may be received as a user input. Alternatively, or additionally, the predetermined optimal grip alignment position may have a default value, for example should a user not select or provide a grip alignment position. With a golf club, the default position may be to align the alignment indicator with the leading edge of the club head. However, a user may provide an optimal grip alignment position that differs from the default, such as rotated through 0.5°, 1°, 1.5°, 2°, 90°, 180°, or any other number of degrees from aligned with the leading edge.

The grip installation instruction may be interpreted by a user or a computer to determine in which position the alignment indicator should be positioned when the grip is installed. As such, a user or further controlled apparatus may apply a grip in accordance with the grip installation instruction.

The contact portion may be a portion of the sports equipment intended or designed to contact a ball or another piece of sports equipment. The sports equipment may be a golf club. The shaft or body may be a shaft of the golf club. The contact portion may be a leading edge of a head of the golf club. The grip may be a golf grip. Accordingly, the system may be a golf grip installation system. Alternatively, the sports equipment may be a tennis racket, a badminton racket, a squash racket, a cricket bat, a hockey stick, a hurley, a baseball bat, a lacrosse stick, a table tennis paddle, a fishing rod, or any other known sports equipment configured to be held by a user that may be provided with a grip.

The alignment device may comprise an actuator operable to reposition the alignment device with respect to the jig and a piece of sports equipment held therein. The actuator may be mechanical or electromechanical. The actuator may be configured to be actuated by a user. Alternatively, the actuator may be configured to be actuated by a servo or another processor controlled component.

The processor may be further configured to: operate the actuator, in response to the first prompt, to align the alignment device with respect to the predetermined plane. As such, the alignment device may be automatically aligned with the predetermined plane. The processor may be further configured to operate the actuator, in response to the second prompt, to align the alignment device with respect to the sports equipment such that the camera is aligned with the shaft or body of the sports equipment. As such, the camera may be automatically aligned with the sports equipment.

The system may further comprise an audible and/or visual output device operable by the processor to provide the first and/or second prompt to the user as an audible and/or visual prompt. For example, the output device may display a message, turn on a light, or make a sound when the prompt is to be provided. The audible and/or visual output device may be further operable by the processor to provide audible and/or visual feedback when the alignment device is aligned with the predetermined plane. In this way, a user may move the alignment device until the feedback is provided and the alignment device is correctly positioned. The audible and/or visual output device may be further operable by the processor to provide audible and/or visual feedback when the camera is aligned with the shaft or body of the sports equipment. In this way, a user may move the camera or sports equipment until the feedback is provided and the camera and sports equipment are correctly aligned.

The output device may include a user input device. A user may overlay a reference image, such as a line, on the images captured by the camera. For example, a user may overlay a line on the leading edge of the golf club, thereby identifying the leading edge. Alternatively, a pre-set overlaid line may be provided, and the user may rotate the golf club about the longitudinal axis until the leading edge of the golf club aligns with the overlaid line. Alternatively, the alignment device, including the camera, may be rotated about the longitudinal axis of the golf club until the leading edge of the golf club aligns with the overlaid line. As a further alternative, the pre-set overlaid line may be moved until the leading edge of the golf club aligns with the overlaid line. As a yet further alternative, the alignment may be made with a marker on the shaft of the golf club, for example a line 180° rotated relative to the leading edge of the golf club. An audible notification may be provided to the user when the respective alignment or positioning is made, such that the user need not look away from the golf club and at a screen to confirm alignment or positioning.

A second visual marker may be displayed on the screen indicating the position at which the alignment indicator of the grip should be placed. The second visual marker may include a clocking feature to indicate a precise rotational angle at which the alignment indicator should be positioned for the respective golfer. The clocking feature may display a rotational angle clockwise or anticlockwise.

A user may use the input device to provide an area of the field of view of the camera in which the piece of sports equipment, or the various components of interest of the sports equipment, are located. For example, with a golf club, a user may draw a box around the entire golf club, or draw a first box around the club head and a second box around the shaft. In this way, the processor may focus the identification algorithms in the box or boxes defined by the user to reduce computing requirements and increase processing speed. As such, the image processing algorithms may operate more efficiently and/or accurately. Furthermore, the risk of false positives and/or false negatives in the analysis may be reduced or removed.

The processor may be further configured and operable to determine a rotational movement of the sports equipment relative to the alignment device required to position the contact portion in a predetermined contact portion position.

For example, with a golf club, the predetermined position may be to position the leading edge of the club head perpendicular or 90° to the ground. The processor may be further configured and operable to output a third prompt for the alignment device or sports equipment to be moved such that the contact portion is in the predetermined contact portion position. In this way, the required movement necessary to correctly position the contact portion may be provided. Accordingly, the user or a processor controlled component may adjust the position of the sports equipment such that the contact portion is correctly positioned. The sports equipment grip installation system may further comprise a second actuator configured to rotate the sports equipment about a shaft or body axis of the sports equipment. The processor may be further configured to operate the second actuator, in response to the third prompt, to position the contact portion in the predetermined contact portion position. As such, the second actuator may be controlled to automatically reposition the sports equipment.

The processor may be further configured to capture at least one third image with the camera and determine, with a grip identification algorithm, that a grip has been installed on a grip receiving portion of the sports equipment. The at least one third image may include a single image, a series of single images such as a continuous feed of images spaced in time, or a video feed. The images or video feed may be live. The grip identification algorithm may be used to determine that a grip has been installed on the sports equipment. The grip identification algorithm may include any identification method known in the art, for example based on colour, depth, or texture.

The processor may be further configured to determine a rotational position of the grip relative to the optimal grip alignment position, determine a rotation of the grip relative to the sports equipment required to position the grip in the optimal grip alignment position, and output a fourth prompt for the grip to be moved such that the grip is positioned in the optimal grip alignment position. In this way, the grip may be installed and then adjusted to position the alignment indicator in the desired position.

The processor may be further configured to output a fifth prompt when the grip is positioned in the optimal grip alignment position. The processor may be configured to operate an audible and/or visual output device to provide the fifth prompt to a user as an audible and/or visual prompt. In this way, a user may adjust the grip until the feedback is received and the grip is correctly positioned.

The grip identification algorithm may include a trained grip identification machine learning algorithm. The grip identification machine learning algorithm may be trained with a labelled dataset including images of sports equipment with and without grips. The dataset may include images with grips of different size, shape, colour or any other characteristic. Images of other, similar looking, components may be included to improve the accuracy of the algorithm.

The shaft identification algorithm may include a trained shaft or body identification machine learning algorithm. The shaft or body identification machine learning algorithm may be trained with a labelled dataset including images of sports equipment shafts or bodies across the breadth of options available. For example, in golf, steel and graphite shafts are typically available. The shaft may be painted or otherwise decorated. Images of other, similar looking, components may be included to improve the accuracy of the algorithm.

The contact portion identification algorithm may include a trained contact portion identification machine learning algorithm. The contact portion identification machine learning algorithm may be trained with a labelled dataset including images of contact portions of the sports equipment. For example, in golf, images of club heads and faces of putters, wedges, irons, hybrids, woods and drivers may be included. Images of other, similar looking, components may be included to improve the accuracy of the algorithm. The, or each, trained machine learning algorithm described herein may include a learned system of weights and operations and may incorporate convolutional layers, densely connected layers of neurons and/or other types of neural network connections and operations.

The, or each, algorithm may analyse the pattern of pixels in the images captured by the camera. The input data may be, for example, 8-bit whereby each pixel is represented as a value from 0 to 255, with three channels of data corresponding to red, green and blue colours. The, or each, algorithm may use a rules-based system of a learned set of operations and weights to determine the subsection of the image that contains the relevant feature of interest, such as the golf grip or shaft. Edges may be identified via a Sobel Filter, or via a pixel colour distribution analysis. Other identification methods are envisaged.

The sports equipment grip installation system may further comprise a grip installation device. The grip installation device may be configured to be controlled by the processor to install a grip on a grip receiving portion of the sports equipment in accordance with the installation instruction. Accordingly, the grip may be installed automatically, without the need for user intervention. The grip installation device may comprise a grabber. The grabber may include a clamp or similar grabbing device capable of picking and moving a grip. The processor may be configured to receive an input including a grip type, and the processor may be further configured to operate the grabber to grab a grip of the selected grip type and install the grip on the grip receiving portion of the sports equipment. The grip installation device may comprise a tape application device operable by the processor to apply at least one layer of tape to the grip receiving portion of the sports equipment before the grip is installed. The tape may be applied over a length of the shaft equal to a length of the grip to be installed. A user input may be provided to specify the number of layers of tape to be used. Some golfers prefer to use more than one layer of tape to provide a relatively larger and firmer grip. The grip installation device may include a solvent application device configurable to apply solvent to the tape such that the grip may be more easily installed.

According to a second aspect of the present disclosure, there is provided a sports equipment grip installation method comprising the steps: providing a jig comprising a clamp; providing an alignment device comprising a camera, a position sensor and a processor; securing a piece of sports equipment in the jig such that a shaft or body of the sports equipment is held within a predetermined plane; and operating the processor to: determine an alignment of the alignment device with respect to the predetermined plane based on an output of the position sensor; output a first prompt for the alignment device to be moved to align with the predetermined plane; capture at least one first image with the camera; determine, with a shaft identification algorithm and the at least one first image, a relative alignment of the camera with respect to the shaft or body of the sports equipment; output a second prompt for the alignment device or sports equipment to be moved such that the camera is aligned with the shaft or body of the sports equipment; capture at least one second image with the camera; determine, with a contact portion identification algorithm and the at least one second image, a position of a contact portion of the sports equipment relative to the predetermined plane; receive a predetermined optimal grip alignment position indicating an optimal position of an alignment indicator of a grip with respect to the contact portion of the sports equipment; and output a grip installation instruction indicating an installation orientation for the grip such that, following installation of the grip in the installation orientation, the alignment indicator of the grip is positioned according to the predetermined optimal alignment position.

The second aspect may include any or each of the features disclosed with respect to the first aspect. In particular, any operational step of the processor of the first aspect may be included as an operational method step of the second aspect.

BRIEF DESCRIPTION OF THE DRAWINGS

The disclosure will now be described, by way of example only, with reference to the accompanying drawings, in which.

DETAILED DESCRIPTION

Figure 1:
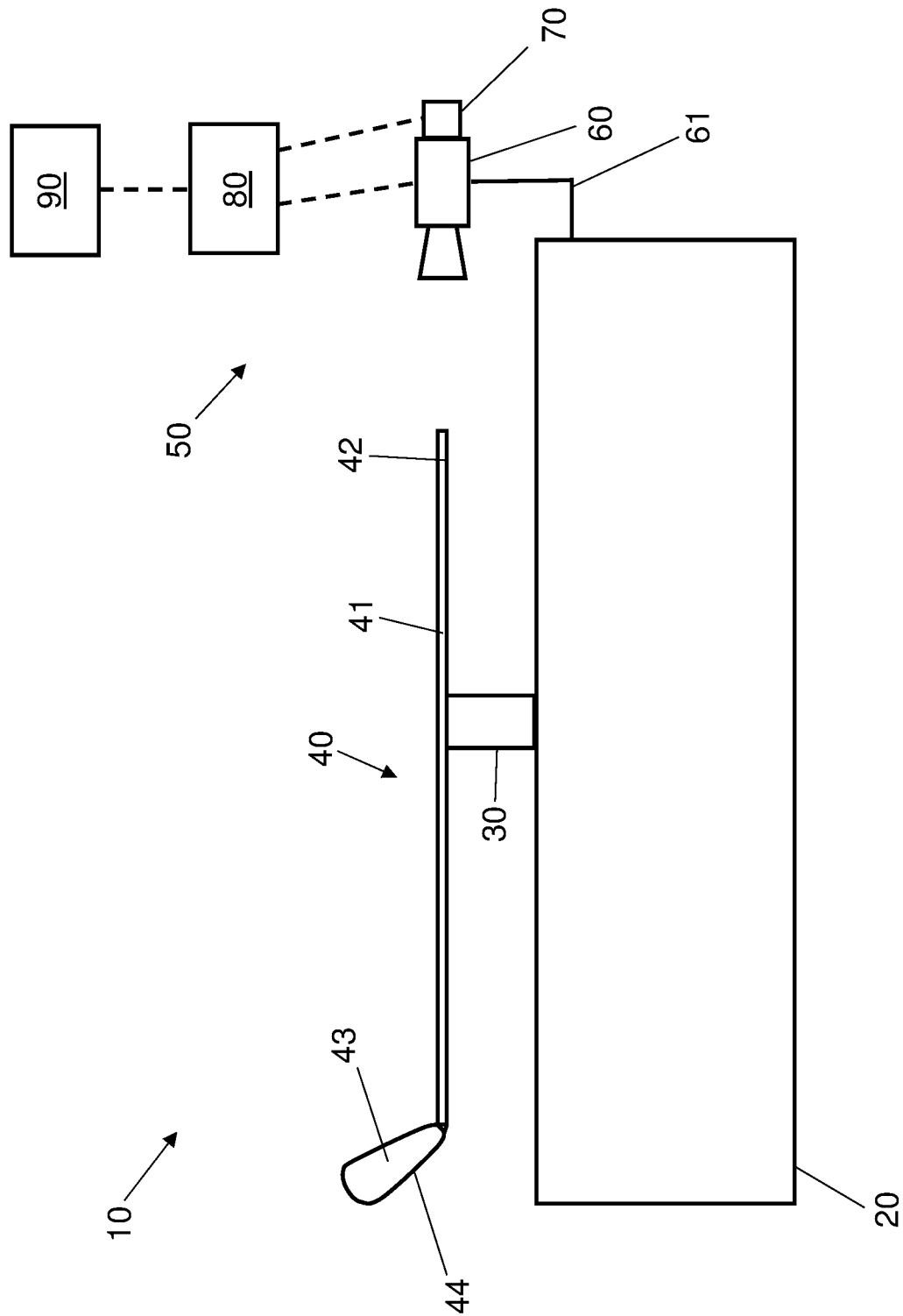
FIG. 1 is a schematic view of a grip installation system.

FIG. 1 is a schematic view of a grip installation system 10 suitable for accurately installing a grip on a piece of sports equipment, such as a golf club. The system 10 includes a jig 20 that provides a supporting structure for the various other components of the system 10. The jig 20 includes a clamp 30 configured to releasably hold a piece of sports equipment, such as a golf club 40 as shown in FIG. 1, adjacent to the jig 20. The clamp 30 may take any form such as a vice clamp, a spring clamp or a 'C' clamp. The gripping strength of the clamp 30 may be suitable to retain the golf club 40 without damaging the golf club 40. The clamp 30 is shown to hold an approximately central portion of a shaft 41 of the golf club 40. However, the clamp 30 may be arranged to hold any part of the golf club 40, such that sufficient access to the butt end 42 of the golf club 40 is provided to install a grip and the clamp 30 does not interfere with the grip installation method discussed with reference to FIGS. 2 to 5.

The golf club 40 is held such that the shaft 41 lies in a substantially horizontal plane with the shaft 41, butt end 42, club head 43 and leading edge 44 in view of an alignment device 50. The alignment device 50 includes a camera 60, a position sensor 70 such as an accelerometer, a processor 80 and a feedback device 90. The camera 60 is shown to be supported by the jig 20 via a camera mount 61, and the position sensor 70 is shown to be attached to the camera 60. However, other arrangements are envisaged. The camera 60, the position sensor 70 and the feedback device 90 are in communication with the processor 80. Wireless communication is schematically shown, but wired communication is also envisaged. The camera 60 is moveable relative to the golf club 40, as is explained with reference to FIGS. 2 to 5. The clamp 30 and/or camera mount 61 may be adjustable to allow for realignment of the golf club 40 and the alignment device 50. The feedback device 90 is arranged to provide a user with visual and/or audible feedback and may therefore include a screen and/or loudspeaker. The processor 80 is configured to carry out the method discussed with reference to FIGS. 2 to 5.

Figure 2:
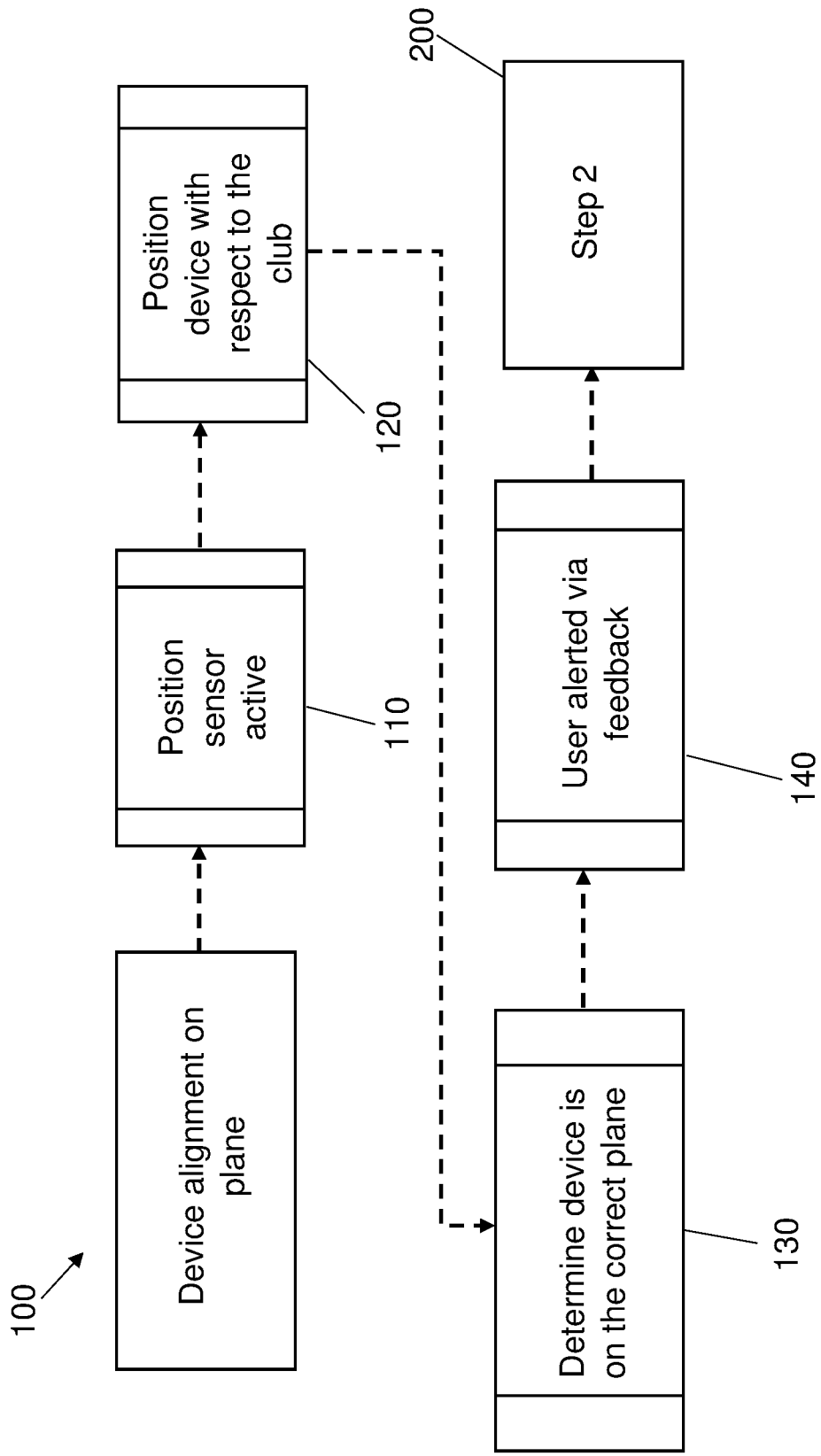
FIG. 2 is a flow diagram of a first step of a grip installation method.

FIG. 2 is a flow diagram of a first step 100 of a grip installation method. The first step 100 of the method is to align the alignment device 50 with a predetermined plane. In the arrangement shown in FIG. 1, the plane is a horizontal plane and the shaft 41 of the golf club 40 lies in the plane. However, other planes are envisaged. The position sensor 70, such as an accelerometer, is activated 110. Following the activation 110 of the position sensor 70, the alignment device 50 is positioned 120 relative to the golf club 40 such that the alignment device 50 is generally in or adjacent to the plane containing the shaft 41 of the golf club 40. The processor 80 is arranged to continuously monitor the output of the position sensor 70 whilst a user or other component moves the alignment device 50. Once the output of the position sensor 70 indicates that the alignment device 50 is correctly positioned with respect to the plane, the processor 80 determines 130 the alignment device 50 is on the correct plane. The determination 130 may be made via one of several techniques or algorithms, as will be apparent from the present disclosure, such as a trained machine learning algorithm. With an accelerometer, the device 50 may be correctly positioned when the force of gravity, which is the only force acting upon the accelerometer when the system is at rest, is projected onto a single axis only and/or the force measured along an axis aligned with the shaft 41 is zero. When the alignment device 50 is correctly positioned with respect to the plane, a user is alerted 140 via the feedback device 90. The second step 200 of the method follows the alerting 140 of the user and is discussed with reference to FIG. 3.

Figure 3:
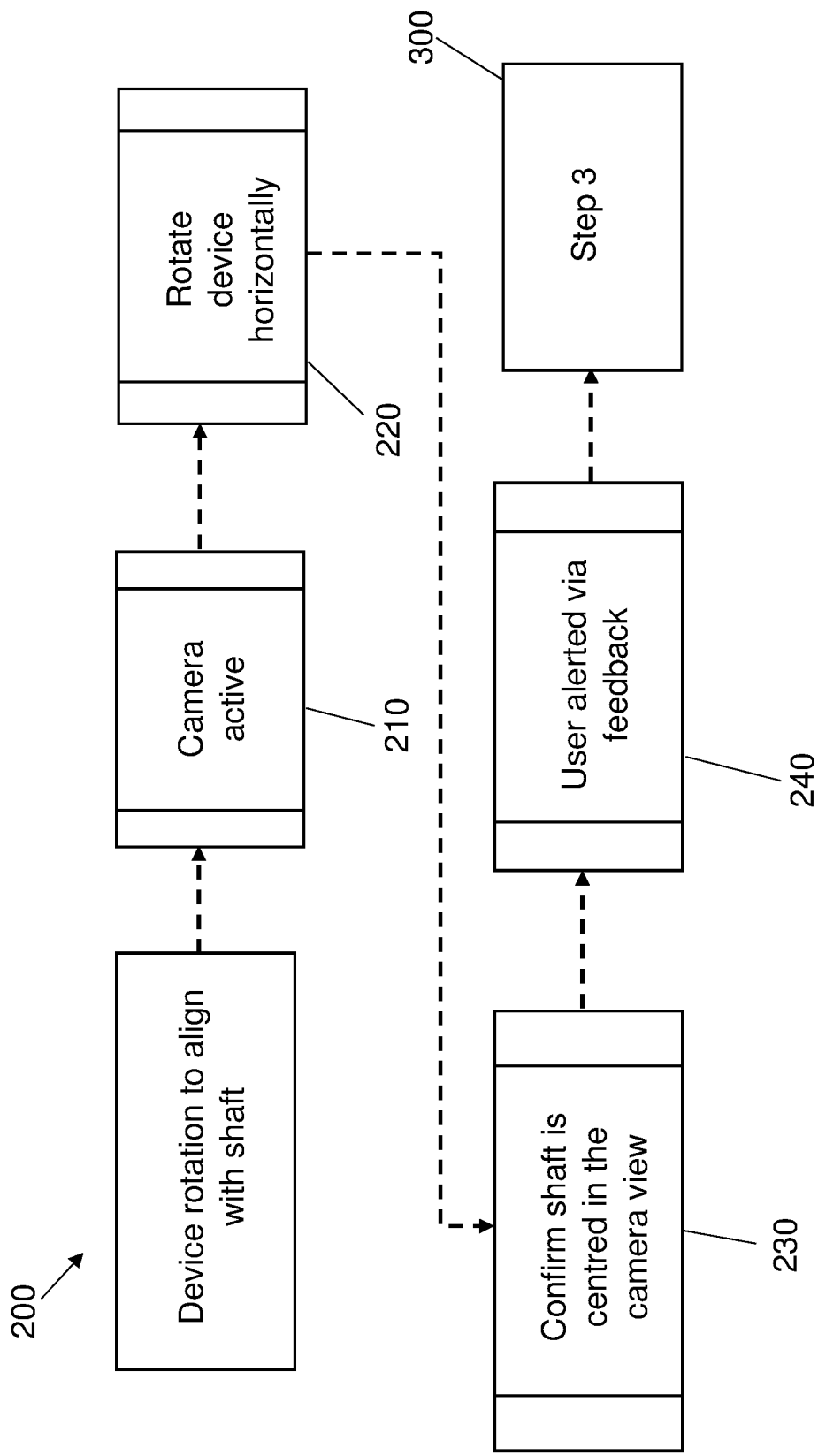
FIG. 3 is a flow diagram of a second step of the grip installation method.

FIG. 3 is a flow diagram of a second step 200 of the grip installation method. The second step 200 of the method is to rotate the device 50 to align the device 50 with the shaft 41 of the golf club 40. The camera 60 is activated 210 and begins capturing images. The processor 80 analyses the images from the camera 60 to identify the shaft 41 of the golf club. The alignment device 50 is rotated 220 horizontally by the user or another component until the shaft 41 is centred in the view of the camera 60. The processor 80 is arranged to confirm 230 the shaft 41 is centred in the camera 60 view by confirming that the left and right edges of the shaft 41 are equidistant from a centre line of the shaft 41. The confirmation 230 may be made via one of several techniques or algorithms, as will be apparent from the present disclosure, such as a trained machine learning algorithm. When the shaft 41 is correctly centred, a user is alerted 240 via the feedback device 90. The third step 300 of the method follows the alerting 240 of the user and is discussed with reference to FIG. 4.

Figure 4:
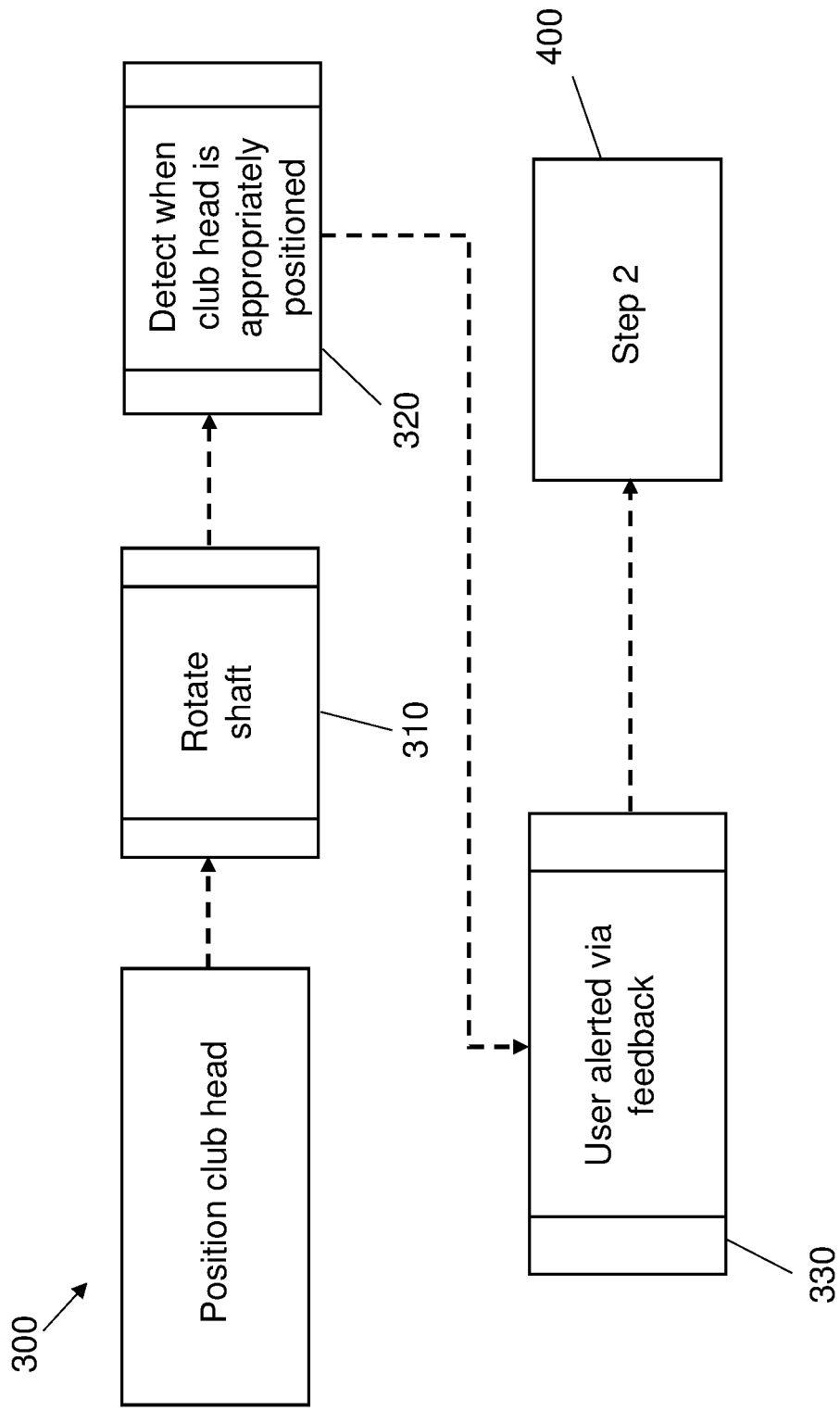
FIG. 4 is a flow diagram of a third step of the grip installation method.

FIG. 4 is a flow diagram of a third step 300 of the grip installation method. The third step 300 of the method is to position the club head 43 appropriately. The grip is to be installed such that an alignment marker or indicator on the grip is aligned in a preferred position relative to the leading edge 44 of the club head 43. Accordingly, the position of the club head 43 and leading edge 44 must be identified. The camera 60 captures images of the club head 43 and the shaft 41 of the golf club 40 is rotated 310, by the user or another component, until the processor 80 detects 320 when the club head 44 is appropriately positioned. In particular, the processor 80 may detect when the leading edge 44 of the club head 43 is arranged vertically in the view of the camera 60. The detection 320 may be made via one of several techniques or algorithms, as will be apparent from the present disclosure, such as a trained machine learning algorithm. When the club head 43 is correctly positioned, a user is alerted 330 via the feedback device 90. The fourth step 400 of the method follows the alerting 330 of the user and is discussed with reference to FIG. 5.

Figure 5:
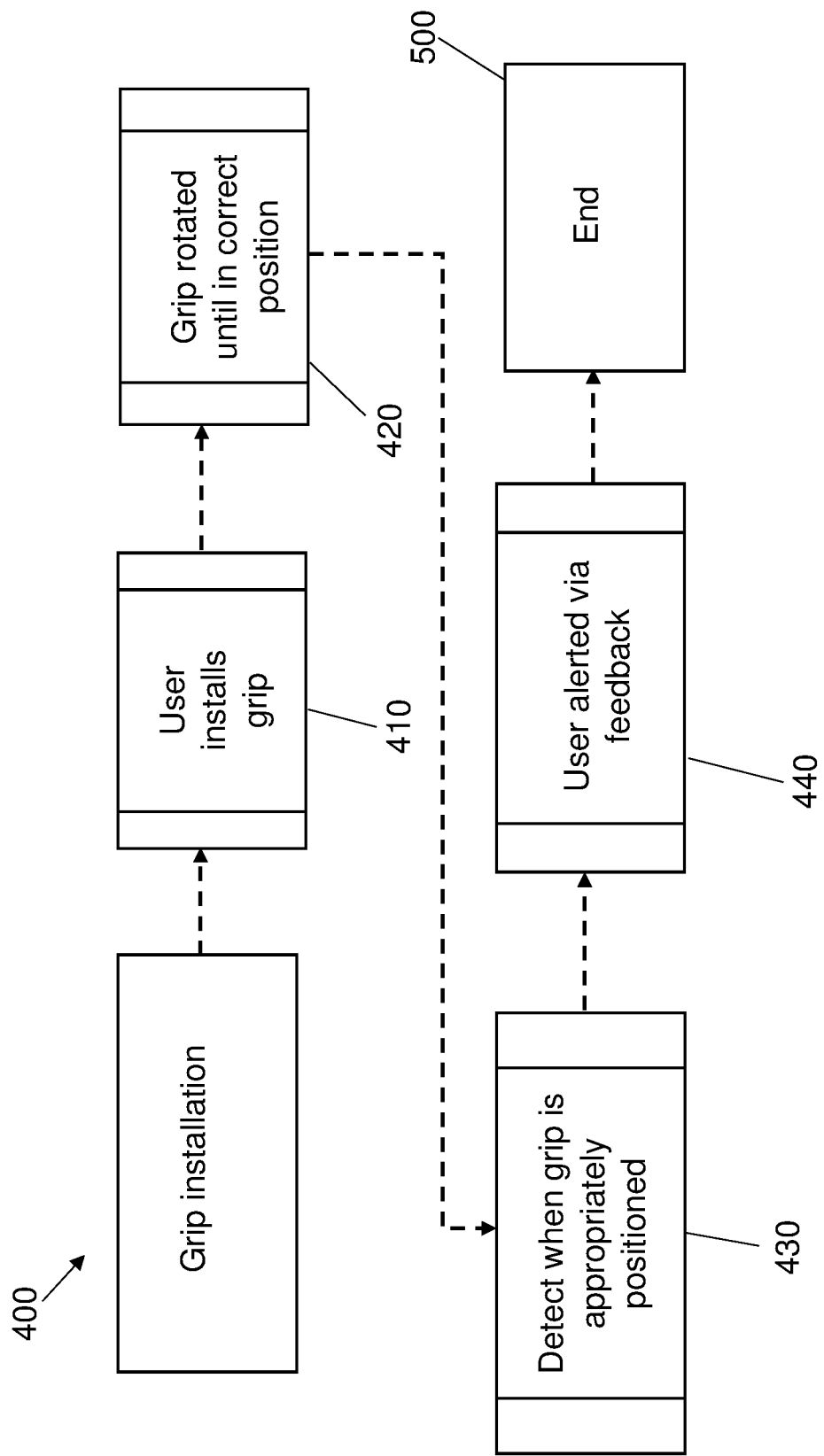
FIG. 5 is a flow diagram of a fourth step of the grip installation method.

FIG. 5 is a flow diagram of a fourth step 400 of the grip installation method. The fourth step 400 of the method is to install the grip on the butt end 42 of the golf club 40. The user installs 410 a grip on the butt end 42 of the golf club 40. A processor 80 controlled grip installation device is also envisaged. Once the grip is installed 410, the processor 80 identifies the grip via the images received from the camera 60. Various grip identification techniques or algorithms will be apparent from the present disclosure, such as a trained machine learning algorithm. The grip, once installed, may then be rotated 420 until the alignment marker or indicator is correctly positioned with respect to the leading edge 44 of the golf club 40. The processor 80 is configured to detect 430 when the grip is appropriately positioned, and the user is then alerted 440 via the feedback device 90. The detection 430 may be made via one of several techniques or algorithms, as will be apparent from the present disclosure, such as a trained machine learning algorithm. Accordingly, following the grip installation method provides a golf club with an accurately and reliably installed grip.

Although a golf club 40 is shown and described, any other piece of sports equipment requiring a grip may be the subject of the grip installation method. Additional components and method steps may be included, as will be apparent from the present disclosure.

The invention claimed is:

1. A sports equipment grip installation system for installing a grip of the type comprising an alignment indicator, the system comprising:
a jig comprising a clamp configured to, in use, receive and retain a piece of sports equipment therein such that a shaft or body of the sports equipment is held within a predetermined plane; and
an alignment device comprising a camera, a position sensor and a processor configured and operable to:
determine an alignment of the alignment device with respect to the predetermined plane based on an output of the position sensor;
output a first prompt for the alignment device to be moved to align with the predetermined plane;
capture at least one first image with the camera;
determine, with a shaft identification algorithm and the at least one first image, a relative alignment of the camera with respect to the shaft or body of the sports equipment;
output a second prompt for the alignment device or sports equipment to be moved such that the camera is aligned with the shaft or body of the sports equipment;
capture at least one second image with the camera;
determine, with a contact portion identification algorithm and the at least one second image, a position of a contact portion of the sports equipment relative to the predetermined plane;
receive a predetermined optimal grip alignment position indicating an optimal position of the alignment indicator of the grip with respect to the contact portion of the sports equipment; and
output a grip installation instruction indicating an installation orientation for the grip such that, following installation of the grip in the installation orientation, the alignment indicator of the grip is positioned according to the predetermined optimal alignment position,
wherein the shaft identification algorithm comprises a trained shaft or body identification machine learning algorithm and the contact portion identification algorithm comprises a trained contact portion identification machine learning algorithm.

2. The sports equipment grip installation system of claim 1, wherein the sports equipment is a golf club, the shaft or body is a shaft of the golf club, and the contact portion is a leading edge of a head of the golf club.

3. The sports equipment grip installation system of claim 1, wherein the alignment device comprises an actuator operable to reposition the alignment device with respect to the jig and the piece of sports equipment held therein.

4. The sports equipment grip installation system of claim 3, wherein the processor is further configured to:
operate the actuator, in response to the first prompt, to align the alignment device with respect to the predetermined plane; and
operate the actuator, in response to the second prompt, to align the alignment device with respect to the sports equipment such that the camera is aligned with the shaft or body of the sports equipment.

5. The sports equipment grip installation system of claim 1, wherein the system further comprises an audible and/or visual output device operable by the processor to provide the first and/or second prompt to the user as an audible and/or visual prompt.

6. The sports equipment grip installation system of claim 5, wherein the audible and/or visual output device is further operable by the processor to provide audible and/or visual feedback when the alignment device is aligned with the predetermined plane.

7. The sports equipment grip installation system of claim 5, wherein the audible and/or visual output device is further operable by the processor to provide audible and/or visual feedback when the camera is aligned with the shaft or body of the sports equipment.

8. The sports equipment grip installation system of claim 1, wherein the processor is further configured and operable to:
determine a rotational movement of the sports equipment relative to the alignment device required to position the contact portion in a predetermined contact portion position; and
output a third prompt for the alignment device or sports equipment to be moved such that the contact portion is in the predetermined contact portion position.

9. The sports equipment grip installation system of claim 8, further comprising a second actuator configured to rotate the sports equipment about a shaft or body axis of the sports equipment.

10. The sports equipment grip installation system of claim 9, wherein the processor is further configured to operate the second actuator, in response to the third prompt, to position the contact portion in the predetermined contact portion position.

11. The sports equipment grip installation system of claim 1,
wherein the processor is further configured to capture at least one third image with the camera and determine, with a grip identification algorithm, that the grip has been installed on a grip receiving portion of the sports equipment.

12. The sports equipment grip installation system of claim 11, wherein the processor is further configured to determine a rotational position of the grip relative to the optimal grip alignment position, determine a rotation of the grip relative to the sports equipment required to position the grip in the optimal grip alignment position, and output a fourth prompt for the grip to be moved such that the grip is positioned in the optimal grip alignment position.

13. The sports equipment grip installation system of claim 12, wherein the processor is further configured to output a fifth prompt when the grip is positioned in the optimal grip alignment position and operate an audible and/or visual output device to provide the fifth prompt to a user as an audible and/or visual prompt.

14. The sports equipment grip installation system of claim 11, wherein the grip identification algorithm comprises a trained grip identification machine learning algorithm.

15. The sports equipment grip installation system of claim 1, wherein the position sensor comprises an accelerometer and/or a gyroscope.

16. The sports equipment grip installation system of claim 1, further comprising a grip installation device configured to be controlled by the processor to install the grip on a grip receiving portion of the sports equipment in accordance with the grip installation instruction.

17. The sports equipment grip installation system of claim 16, wherein the grip installation device comprises a grabber, the processor is configured to receive an input comprising a grip type, and the processor is further configured to operate the grabber to grab the grip of the selected grip type and install the grip on the grip receiving portion of the sports equipment.

18. The sports equipment grip installation system of claim 16, wherein the grip installation device comprises a tape application device operable by the processor to apply at least one layer of tape to the grip receiving portion of the sports equipment before the grip is installed.

19. A sports equipment grip installation system for installing a grip of the type comprising an alignment indicator, the system comprising:
a jig comprising a clamp configured to, in use, receive and retain a piece of sports equipment therein such that a shaft or body of the sports equipment is held within a predetermined plane; and
an alignment device comprising a camera, a position sensor and a processor configured and operable to:
determine an alignment of the alignment device with respect to the predetermined plane based on an output of the position sensor;
output a first prompt for the alignment device to be moved to align with the predetermined plane;
capture at least one first image with the camera;
determine, with a shaft identification algorithm and the at least one first image, a relative alignment of the camera with respect to the shaft or body of the sports equipment;
output a second prompt for the alignment device or sports equipment to be moved such that the camera is aligned with the shaft or body of the sports equipment;
capture at least one second image with the camera;
determine, with a contact portion identification algorithm and the at least one second image, a position of a contact portion of the sports equipment relative to the predetermined plane;
receive a predetermined optimal grip alignment position indicating an optimal position of the alignment indicator of the grip with respect to the contact portion of the sports equipment; and
output a grip installation instruction indicating an installation orientation for the grip such that, following installation of the grip in the installation orientation, the alignment indicator of the grip is positioned according to the predetermined optimal alignment position,
wherein the processor is further configured to capture at least one third image with the camera and determine, with a grip identification algorithm, that the grip has been installed on a grip receiving portion of the sports equipment.

20. The sports equipment grip installation system of claim 19, wherein the processor is further configured to determine a rotational position of the grip relative to the optimal grip alignment position, determine a rotation of the grip relative to the sports equipment required to position the grip in the optimal grip alignment position, and output a fourth prompt for the grip to be moved such that the grip is positioned in the optimal grip alignment position.

21. The sports equipment grip installation system of claim 19, wherein the processor is further configured to output a fifth prompt when the grip is positioned in the optimal grip alignment position and operate an audible and/or visual output device to provide the fifth prompt to a user as an audible and/or visual prompt.

22. The sports equipment grip installation system of claim 19, wherein the grip identification algorithm comprises a trained grip identification machine learning algorithm.

23. A sports equipment grip installation system for installing a grip of the type comprising an alignment indicator, the system comprising:
a jig comprising a clamp configured to, in use, receive and retain a piece of sports equipment therein such that a shaft or body of the sports equipment is held within a predetermined plane;
a grip installation device configured to be controlled by a processor to install the grip on a grip receiving portion of the sports equipment in accordance with a grip installation instruction; and
an alignment device comprising a camera, a position sensor and the processor configured and operable to:
determine an alignment of the alignment device with respect to the predetermined plane based on an output of the position sensor;
output a first prompt for the alignment device to be moved to align with the predetermined plane;
capture at least one first image with the camera;
determine, with a shaft identification algorithm and the at least one first image, a relative alignment of the camera with respect to the shaft or body of the sports equipment;
output a second prompt for the alignment device or sports equipment to be moved such that the camera is aligned with the shaft or body of the sports equipment;
capture at least one second image with the camera;
determine, with a contact portion identification algorithm and the at least one second image, a position of a contact portion of the sports equipment relative to the predetermined plane;
receive a predetermined optimal grip alignment position indicating an optimal position of the alignment indicator of the grip with respect to the contact portion of the sports equipment; and output the grip installation instruction indicating an installation orientation for the grip such that, following installation of the grip in the installation orientation, the alignment indicator of the grip is positioned according to the predetermined optimal alignment position.

24. The sports equipment grip installation system of claim 23, wherein the grip installation device comprises a grabber, the processor is configured to receive an input comprising a grip type, and the processor is further configured to operate the grabber to grab the grip of the selected grip type and install the grip on the grip receiving portion of the sports equipment.

25. The sports equipment grip installation system of claim 23, wherein the grip installation device comprises a tape application device operable by the processor to apply at least one layer of tape to the grip receiving portion of the sports equipment before the grip is installed.

* * * * *